April 24, 1951 M. E. BENNETT 2,550,443
DYNAMOELECTRIC MACHINE
Filed April 26, 1950
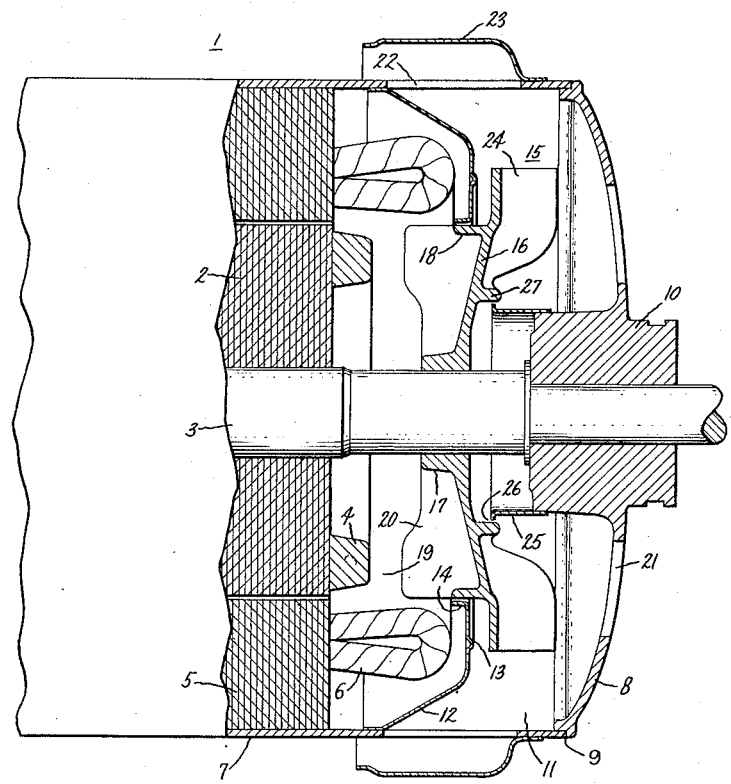
Inventor:
Maurice E. Bennett,
by Ernest H C Britton
His Attorney.

Patented Apr. 24, 1951

2,550,443

UNITED STATES PATENT OFFICE 2,550,443

DYNAMOELECTRIC MACHINE

Maurice E. Bennett, Fort Wayne, Ind., assignor to General Electric Company, a corporation of New York Application April 26, 1950, Serial No. 158,277

2 Claims. (Cl. 171—252)

1

This invention relates to dynamoelectric machines and more particularly to ventilating arrangements for such machines, especially dynamoelectric machines of the totally enclosed type.

In the design of dynamoelectric machines of the totally enclosed type, it is customary to provide an internal fan for circulating internal air in the interior of the machine and an external fan for circulating the external air over the heat transferring surfaces of the machine. In such machines, particularly in the fractional horsepower frame sizes, it may be desirable to provide a single fan having a common back plate forming a running seal with a baffle member to provide the enclosure for the machine with internal fan blades on one side of the back plate within the enclosure for circulating internal air and external blades on the other side of the back plate for circulating the external air. In such a construction, it may be further desirable to provide means for preventing the entrance of dirt and moisture into the bearing of the machine.

An object of this invention is to provide an improved ventilating arrangement for a dynamoelectric machine.

Another object of this invention is to provide an improved ventilating arrangement for a totally enclosed dynamoelectric machine.

A further object of this invention is to provide an improved ventilating arrangement for a totally enclosed dynamoelectric machine including means for preventing the entrance of dirt into the bearing.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, there is provided a dynamoelectric machine having a rotor mounted on a shaft and a stator frame member. An end shield cooperates with the stator frame member to form a cavity at the end of the rotor and carries a bearing which rotatably supports the shaft. An annular baffle member extends inwardly into the cavity from the stator frame member, and a fan is mounted on the shaft in the cavity. The fan is formed with an imperforate back plate having a portion forming a running seal with the baffle member so that the baffle member and the fan back plate define a closed compartment at the end of the rotor and stator of the machine. Internal blades are formed on the back plate extending into the closed chamber for circulating internal air therein, and external blades are formed on the side of the back plate remote from the closed chamber for circulating external air over the baffle member and over the outer periphery of the machine. Openings are formed in the end shield for admitting air to the external fan blades, and openings are formed in the stator frame member for discharging air from the external fan blades over the outer periphery of the machine. In order to prevent the entrance of dust and moisture into the bearing, an annular baffle member is provided in the cavity having one end secured to the bearing and its other end extending toward the back plate of the fan. An outwardly extending flange portion is formed at the end of this baffle member remote from the bearing. An annular flange portion is formed on the back plate of the fan extending toward the end shield surrounding and overhanging the outwardly extending flange portion of the bearing baffle member. This annular flange cooperates with the outwardly extending flange of the bearing baffle member to form a running seal to prevent the entrance of dust and moisture into the bearing.

In the drawing there is shown a side elevational view, partly in section, illustrating the improved ventilating arrangement of this invention.

Referring now to the drawing, there is shown a dynamoelectric machine 1 having a rotor 2 mounted on a shaft 3. The rotor 2 is shown as being of the squirrel cage type including a plurality of laminations in which squirrel cage bars (not shown) are positioned in suitable slots and are connected by end rings 4. A stator member 5 surrounds the rotor 2 and is provided with suitable windings 6. A stationary frame or shell 7 surrounds and supports the stator member 5. An end shield 8 is secured to the shell member 7 in any suitable manner, as by a rabbet fit as shown at 9, and carries a suitable bearing 10 for rotatably supporting the shaft 3. The end shield 8 cooperating with the shell member 7 defines a cavity 11 at the end of the rotor 2. An annular baffle member 12 is provided having one end secured to the inner surface of the shell member 7 and its other end 13 extending inwardly in the cavity 11. A re-entrant flange portion 14 is formed at the inner periphery of the baffle member 12. In order to provide for ventilating the machine thus far described, a fan 15 is provided having an imperforate back plate 16 formed with a hub portion 17 mounted on the shaft 3. The back plate 16 of the fan 15 is formed with an annular flange portion 18 extending toward the rotor 2 forming a running seal with the reentrant flange portion 14 of the baffle member 12. Thus, the baffle member 12 and the back plate 16 of the fan 15 define an inner closed chamber 19 at the end of the rotor 2 and stator 5. Internal fan blades 20 are formed on the back plate extending into the closed chamber 19 for circulating internal air around the winding 6 extracting heat therefrom. The end shield 8 is provided with a plurality of openings 21 formed therein for admitting external air to the fan 15, and the shell member 7 is provided with a plurality of peripheral openings 22 for discharging air from the fan over the outer periphery of the machine. A shell member 23 covers the openings 22 and serves to direct the air discharged by the fan 15 directly over the outer periphery of the shell 7. External fan blades 24 are formed on the side of the back plate 16 of the fan 15 remote from the closed chamber 19 and serve to circulate external air over the baffle member 12 and discharge the air over the outer periphery of the machines.

In order to prevent the entrance of dirt and moisture into the bearing 10, the arrangement now to be described is provided. An annular baffle member 25 is provided having one end secured to the bearing 10 and its other end extending into the cavity 11 toward the back plate 16 of the fan 15. The end of the annular baffle member 25 toward the back plate 16 is formed with an outwardly extending flange portion 26. Another annular flange portion 27 is formed on the back plate 16 extending toward the end shield 8 and surrounding and overhanging the outwardly extending flange portion 26 of the baffle member 25. The annular flange portion 27 and the outwardly extending flange portion 26 cooperate to form a running seal to prevent the entrance of dirt and moisture into the bearing 10.

It will now be readily seen that this invention provides a dual fan with an integrally formed barrier serving as a revolving dirt protector and heat dissipator from the inside blades to the outside blades. The fan 15 may be formed as a single die cast part and assembled on the shaft as a part of the rotor. Both the baffle member 12 and the dirt protector baffle member 25 are mounted by a simple press fit, and, therefore, the complete assembly can be quickly and inexpensively assembled.

While I have shown and described an embodiment of this invention, further modifications and improvements will occur to those skilled in the art. I desire it to be understood, therefore, that this invention is not limited to the embodiment shown and I intend in the appended claims to cover all modifications within the spirit and scope of this invention.

What I claim as new and desire to secure by Letters Patent of the United States is:

1. In a dynamoelectrice machine having a rotor mounted on a shaft, a bearing for rotatably supporting said shaft, a fan mounted on said shaft, and an annular baffle member having one end secured to said bearing and its other end extending toward said fan, said baffle member having an outwardly extending flange portion formed at said other end, said fan having an annular flange portion formed thereon extending toward said bearing, said annular flange portion surrounding and overhanging said outwardly extending flange of said baffle forming a running seal therewith whereby dirt is prevented from entering said bearing.

2. In a dynamoelectric machine having a rotor mounted on a shaft, a stator frame member, an end shield cooperating with said stator frame member to form a cavity at the end of said rotor, a bearing carried by said end shield for rotatably supporting said shaft, a baffle member extending inwardly in said cavity from said stator frame member, a fan mounted on said shaft in said cavity having an imperforate back plate, said fan back plate having an integrally formed portion forming a running seal with said baffle member whereby said baffle member and said fan back plate form a closed chamber around the end of the rotor and stator of said machine, said fan back plate having integrally formed blades extending into said chamber for circulating internal air therein, said fan back plate having other integrally formed blades on the side remote from said chamber for circulating external air over said baffle, and an annular baffle member having one end secured to said bearing and its other end extending toward said fan back plate, said baffle member having an outwardly extending flange portion formed at said other end, said fan back plate having an integrally formed annular flange portion extending toward said end shield, said annular flange portion surrounding and overhanging said outwardly extending flange portion of said baffle member forming a running seal therewith for preventing the entrance of dirt into said bearing.

MAURICE E. BENNETT.

REFERENCES CITED

The following references are of record in the file of this patent:

UNITED STATES PATENTS

| Number | Name | Date |
| --- | --- | --- |
| 1,141,860 | Balcome | June 1, 1915 |
| 1,405,616 | Mossay | Feb. 7, 1922 |
| 1,645,064 | Lewinnek | Oct. 11, 1927 |
| 1,794,649 | Siler | Mar. 3, 1931 |

FOREIGN PATENTS

| Number | Country | Date |
| --- | --- | --- |
| 72,424 | Switzerland | Aug. 16, 1916 |